United States Patent [19]

Thompson

[11] 4,194,895
[45] Mar. 25, 1980

[54] FLUID FLOW METHOD AND APPARATUS USED IN MANUFACTURE OF GLASS FIBERS

[75] Inventor: Thomas K. Thompson, Granville, Ohio

[73] Assignee: Owens-Corning Fiberglas Corporation, Toledo, Ohio

[21] Appl. No.: 930,464

[22] Filed: Aug. 3, 1978

[51] Int. Cl.² .............................................. C03B 37/02
[52] U.S. Cl. ............................................. 65/2; 65/12
[58] Field of Search .................. 65/1, 2, 11 W, 12; 239/498, 502

[56] References Cited

U.S. PATENT DOCUMENTS

| 3,123,242 | 3/1964 | Imoto et al. | 65/12 X |
| 3,625,025 | 12/1971 | Jensen | 65/12 X |
| 3,829,301 | 8/1974 | Russell | 65/12 X |
| 3,905,790 | 9/1975 | Strickland | 65/1 X |
| 3,979,195 | 9/1976 | Strickland | 65/1 |
| 3,982,915 | 9/1976 | Coggin | 65/1 |
| 3,986,853 | 10/1976 | Coggin et al. | 65/2 |
| 3,988,135 | 10/1976 | Coggin | 65/2 X |
| 4,003,731 | 1/1977 | Thompson | 65/12 |
| 4,033,742 | 7/1977 | Nichols et al. | 65/12 X |
| 4,088,469 | 5/1978 | Schaefer | 65/12 X |

FOREIGN PATENT DOCUMENTS 533552 10/1976 U.S.S.R. ................................ 65/12

Primary Examiner—Robert L. Lindsay, Jr.
Attorney, Agent, or Firm—Ronald C. Hudgens; Philip R. Cloutier; Kenneth H. Wetmore

[57] ABSTRACT

The present invention embraces fluid flow apparatus comprising a first nozzle for discharge of a first fluid therefrom, duct means for receiving the first fluid discharged from the first nozzle and for discharging the first fluid therefrom, and a second nozzle for discharge of a second fluid therefrom for modifying the first fluid upon discharge from the duct means. The present invention also embraces a method of controlling the environment of the fiber forming region of a glass fiber forming bushing comprising establishing a first flow of fluid in which the fluid in the center region of the first flow has a flow velocity at least as high as the flow velocity of fluid in all other regions of the first flow, directing a second flow of fluid into contact with the first flow to establish a combined flow in which the fluid in the center region of the combined flow has a flow velocity lower than the flow velocity of fluid in other regions of the combined flow and contacting the fiber forming region with the combined flow.

12 Claims, 4 Drawing Figures

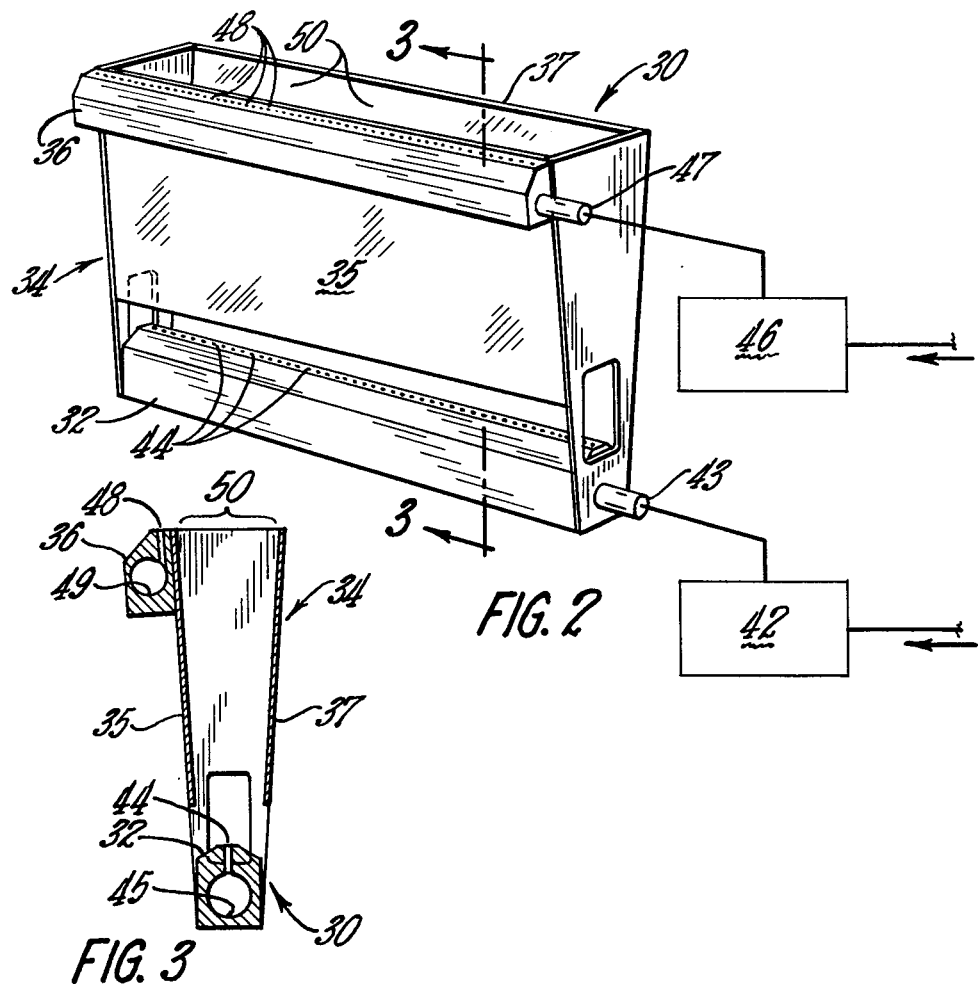
FIG. 2
FIG. 3
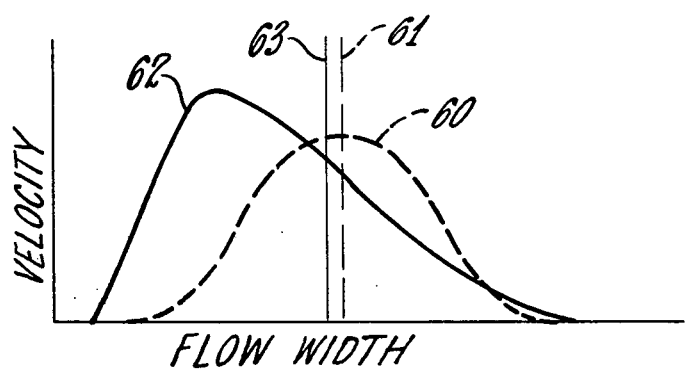
FIG. 4

FLUID FLOW METHOD AND APPARATUS USED IN MANUFACTURE OF GLASS FIBERS

This invention relates to a method and apparatus for fluid flow. More specifically, this invention relates to method of, and an apparatus for, introducing a fluid to a fiber forming bushing from which streams of glass are drawn for controlling the fiber forming environment.

Developments in the production of glass fibers have led to the utilization of streams of fluid, such as air and other gases, impinging upwardly on a fiber forming bushing. The upwardly moving gas streams control the fiber forming environment. Such streams of gas maintain separation of the streams of glass and prevent flooding of the bushing. Also, the cooling effect of the gas streams serves to rapidly quench the glass streams as glass fibers or filaments are attenuated from the bushing.

It has been found that a generally uniform flow of gas at the glass cone region of the bushing is desired. Thus, method and apparatus for delivering or creating such a uniform flow of gas at the glass cone region is important and improvements in such method and apparatus are desired.

The present invention embraces fluid flow apparatus comprising a first nozzle for discharge of a first fluid therefrom, duct means for receiving the first fluid discharged from the first nozzle and for discharging the first fluid therefrom, and a second nozzle for discharge of a second fluid therefrom for modifying the first fluid upon discharge from the duct means. The first and second fluids can be alike or can differ.

The present invention also embraces a method of controlling the environment of the fiber forming region of a glass fiber forming bushing comprising establishings a first flow of fluid in which the fluid in the center region of the first flow has a flow velocity at least as high as the flow velocity of fluid in all other regions of the first flow, directing a second flow of fluid into contact with the first flow to establish a combined flow in which the fluid in the center region of the combined flow has a flow velocity lower than the flow velocity of fluid in other regions in the combined flow and contacting the fiber forming region with the combined flow.

An object of the invention is to provide an improved method and apparatus for fluid flow.

Another object of the invention is to provide an improved fluid flow method and apparatus for use in a glass fiber forming operation.

These and other objects will become apparent when the following specification is considered along with the accompanying drawings in which:

FIG. 2 is a perspective view of fluid flow apparatus according to the principles of this invention;

FIG. 3 is a cross-sectional view of the fluid flow apparatus as seen along line 3—3 of FIG. 2; and FIG. 4 is a graph illustrating the flow velocity profile of the fluid according to the principles of the invention.

Figure 1:
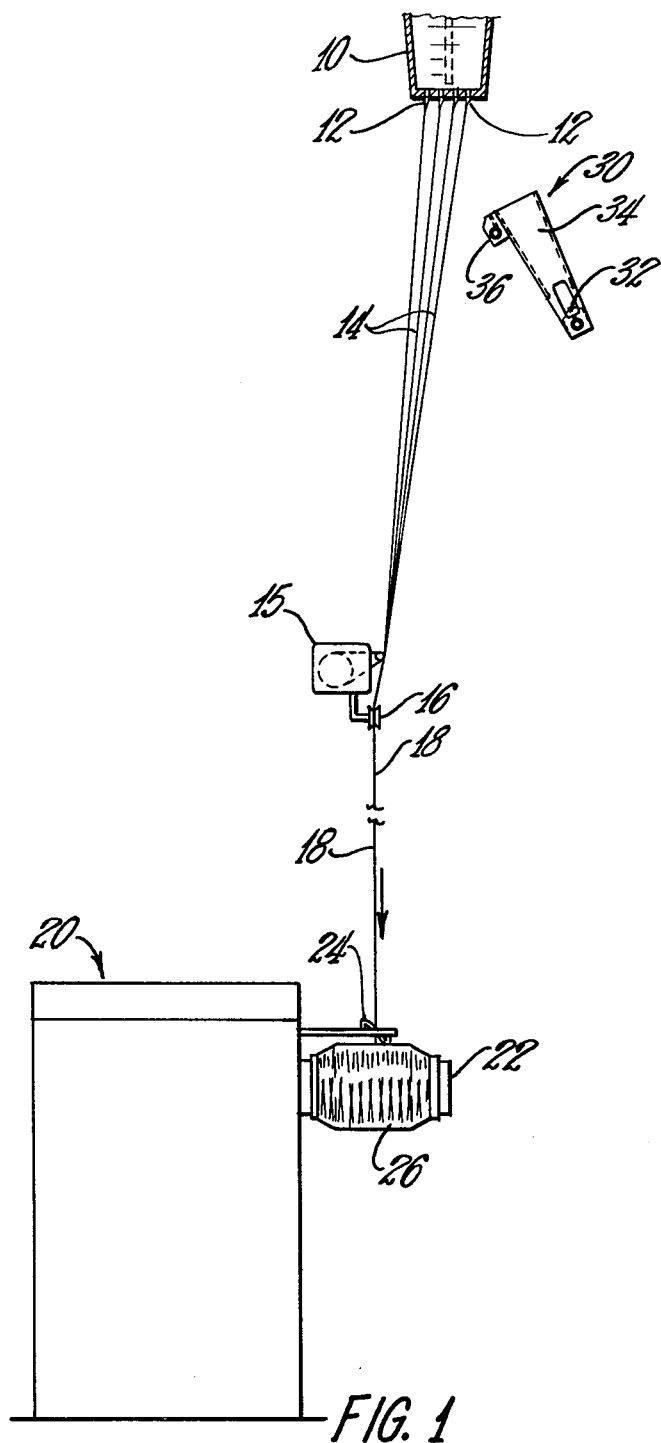
FIG. 1 is a front elevational view of a glass fiber forming operation in accordance with the invention.

With respect to the drawings, FIG. 1 shows bushing 10 connected to a forehearth (not shown) of a furnace for melting glass or glass forming materials. The bushing is provided with a plurality of orifices at which cones 12 of molten glass material are produced for the attenuation of glass filaments 14 therefrom for collection on winding apparatus 20. The filaments are passed over sizing applicator 15 and also over gathering pulley 16 which gathers the filaments into strand 18 for winding into package 26 on the winder apparatus.

Winder 20 has a winding collect 22 mounted for rotation about a horizontal axis for the collection of strand into packages. A collection tube (not shown) can be placed over the collet for collection of the wound package thereon. A variable speed drive (not shown) within the housing of the winder rotates the collet. Conventional winder speed controls (not shown) modify the rotational speed of the collet during formation of packages.

Strand traversing apparatus 24, such as a spiral wire traverse, is provided for distributing the strand along the length of the collet during strand collection.

Bushing 10 in FIG. 1 is shown as a tipless bushing. However, the bushing can have a plurality of orificed projections, or tips, through which the molten glass is supplied for attenuation into fibers.

The glass fiber forming process shown in FIG. 1 is provided with a fluid flow or blower assembly for controlling the fiber forming environment. Control of the fiber forming environment adjacent the glass cones at the regions of the orifices is particularly important. As shown, blower assembly 30 comprises a first flow nozzle 32, a conduit or duct means 34 and a second flow nozzle 36.

FIGS. 2 and 3 show the blower assembly in more detail.

The first flow nozzle comprises a chamber 45 with a fluid inlet 43 for the supply of said fluid from a source 42 and fluid outlets 44 for discharge of the fluid therefrom. Although it is preferred that the fluid be a gaseous material such as air, the fluid can be steam, air mixed with water droplets or various other gases. The fluid source can be a conventional supply source such as an air compressor.

In the embodiment shown, the first flow nozzle is positioned to discharge into channel or duct means 34 and the air discharged from nozzle forms a first fluid flow which passes through the duct means. Duct means 34 can be of any configuration. As shown, the end walls are parallel, and front wall 35 and back wall 37 diverge upwardly and outwardly from the point of discharge of the first fluid into the duct means. As shown, nozzle 32 and the duct means form an induced air blower apparatus such that ambient air is induced into the duct means at the nozzle. The induced air is combined in the duct means for discharge with the air from the nozzle as the first fluid flow.

The nozzle and the duct shown in this embodiment are merely illustrative. It is within the scope of the invention that other nozzle and duct arrangements can be used. For example, duct means which enclose the nozzle or which comprise a series of tubes enclosing individual nozzle discharge orifices can be used. Other duct or conduit means, such as those having internal veins or tubes, can also be used so long as the fluid received from nozzle 32 is properly controlled as the fluid passes through the duct.

The duct means, or channel, directs the fluid passing therethrough and establishes a fluid flow steam such that an established fluid flow stream is discharged from the duct. Establishment of a flow stream is particularly important with an elongated blower, such as rectangular blower, so as to establish a flow exiting therefrom which has a generally uniform velocity profile along its length.

Second flow nozzle 36 modifies the fluid flow being discharged from the discharge region 50 of the duct means. As can be seen from FIG. 3, the discharge outlet 50 of the duct means is substantially larger than the discharge outlet 48 of the second nozzle. Gaseous flow discharging from the duct means is substantially larger than the flow discharging from the second nozzle as can be seen in FIG. 4. The second nozzle is positioned downstream from nozzle 32. As shown, the second nozzle supplies a second fluid flow into contact with the fluid flow being discharged from the duct means establishing a combined flow. The second flow nozzle comprises a chamber 49 having a fluid inlet portion 47 for the supply of fluid from a source 46 and fluid outlets 48 for discharge of the fluid therefrom. As discussed in regard to nozzle 32, the fluid of nozzle 36 can be air or other fluids such as steam, air mixed with water droplets or various other gases.

Blower assembly 30 is constructed of an appropriate shape to provide uniform cooling in the fiber forming region of a bushing. A fiber forming bushing which is rectangular in shape can have a blower assembly as illustrated which is rectangular in shape with nozzles 32 and 36 extending along the length of the bushing. Nozzle 36 is downstream of nozzle 32 and is shown at the fluid discharge end of the duct means. In the embodiment shown, nozzle 36 extends along the length of the duct means and is mounted on the duct. It is within the scope of the invention that the control nozzle can be spaced apart from the discharge end of the duct means and that the control nozzle can be mounted other than on the duct, such as on an independent support means.

FIG. 4 shows two fluid flow velocity profiles taken across the width of the fluid flow. Velocity curve 60 illustrates a bell-shaped velocity profile such that the fluid in the center region of the flow, as marked by line 61, has a flow velocity that is as least as high as the flow velocity of fluid in all other regions of the flow. The flow being discharged from the first nozzle 32 through the duct means has a velocity profile taken across its width as shown in curve 60. The velocity profile of the combined flow illustrated by curve 62 is such that the fluid in the center region of the flow, as indicated by line 63, has a flow velocity that is lower than the flow velocity of fluid in other regions of the combined flow. The combined flow from nozzles 32 and 36 has a velocity profile taken across its width as shown by curve 62. Such velocity profiles can be measured with a pitot tube or a hot wire anemometer.

It has been found that an offset air pattern such as that illustrated by curve 62 provides a more uniform velocity distribution of the air (and more uniform cooling) at the glass cone region of a fiber forming bushing than that provided when a bell-shaped air pattern such as that illustrated by curve 60 is used. The higher velocity portion of the velocity profile is directed toward the side of the bushing furthest from the blower assembly.

Having described the invention in detail, it will be understood that the specific embodiments designated are for the sake of explanation only and that the invention is not limited thereto. Various modifications and substitutions can be made without departing from the scope of the invention as defined in the following claims.

I claim:

1. Apparatus in combination with a glass fiber forming bushing comprising:

(a) a first nozzle for discharge of a first gaseous fluid therefrom;
   (b) duct means for receiving the first gaseous fluid discharged from the first nozzle and for discharging the first gaseous fluid therefrom through a discharge outlet; and
   (c) a second nozzle for discharge of a second gaseous fluid therefrom through a discharge outlet for modifying the first gaseous fluid upon discharge from the duct means, the discharge outlet of the duct means being substantially larger than the discharge outlet of the second nozzle.

2. The apparatus of claim 1 wherein the duct means has a generally rectangular cross-section.

3. The apparatus of claim 2 wherein the duct means comprises a front wall and a back wall which diverge from the point of discharge of said first gaseous fluid into said duct means.

4. The apparatus of claim 1 wherein the second nozzle is at the discharge outlet of the duct means.

5. The apparatus of claim 4 wherein the second nozzle extends along a wall of the duct means at the discharge outlet of the duct means.

6. The apparatus of claim 5 wherein the nozzle is mounted on the wall.

7. The apparatus of claim 1 wherein said first gaseous fluid and second gaseous fluid are air.

8. Method of controlling the environment of the fiber forming region of a glass fiber forming bushing comprising:

(a) establishing a first flow of gaseous fluid in which the gaseous fluid in the center region of the first flow has a flow velocity at least as high as the flow velocity of gaseous fluid in all other regions of the first flow;
   (b) directing a second flow of gaseous fluid into contact with the first flow to establish a combined flow in which the gaseous fluid in the center region of the combined flow has a flow velocity lower than the flow velocity of gaseous fluid in other regions of the combined flow; and
   (c) contacting the fiber forming region with the combined flow.

9. The method of claim 8 comprising the step of passing the first flow through a duct means prior to directing a second flow of gaseous fluid into contact with the first flow.

10. Apparatus for forming continuous glass fibers comprising:

(a) means for flowing streams of heat-softened glass from a supply;
    (b) means for attenuating the streams of glass into continuous fibers; and
    (c) means for controlling the fiber forming environment comprising a first nozzle for discharge of a first flow of air therefrom, duct means for receiving the first flow of air from the first nozzle and for discharging the first flow of air therefrom, and a second nozzle 4 for discharge of a second flow of air therefrom for modifying the first flow upon discharge from the duct means, the first flow being substantially larger than the second flow.

11. Apparatus in combination with a glass fiber forming bushing comprising:

(a) a channel having a discharge outlet;
    (b) a first nozzle positioned within said channel, said first nozzle being adapted for the introduction of a gas thereinto and the discharge of said gas therefrom through said channel discharge outlet; and (c) a second nozzle positioned downstream of said first nozzle, said second nozzle being adapted with an inlet for the introduction of a gas thereinto and an outlet for the discharge of gas therefrom and into contact with the gas discharged from said first nozzle, the channel discharge outlet being substantially larger than the second nozzle outlet.

12. The method of claim 8 wherein the gaseous fluid is air.

* * * * *